Re. 24544

Feb. 22, 1955        P. SMITH        2,702,448

BATTERY POWERED DISK TYPE LAWN MOWER

Filed Aug. 19, 1953

INVENTOR

PHILIP SMITH

BY *A. Yates Dowell*

ATTORNEY

United States Patent Office 2,702,448
Patented Feb. 22, 1955

2,702,448

BATTERY POWERED DISK TYPE LAWN MOWER

Philip Smith, Kissimmee, Fla.

Application August 19, 1953, Serial No. 375,140

1 Claim. (Cl. 56—25.4)

This invention relates to mowing and more particularly to a rotary type lawn mower in which power for driving the cutter is supplied from a battery mounted on the mower.

Power operated lawn mowers are usually driven either by an internal combustion engine or by an electric motor. In the latter type, electricity is usually obtained through a wire which is plugged into the house current.

Among the disadvantages of the use of an internal combustion engine are its relatively high initial cost, difficulty of upkeep, and the high noise level. In the electrical type the necessity for a long electrical cord and for operating the mower without interference from the cord, as well as the shock hazard are undesirable features.

Accordingly, it is an object of the present invention to provide a power operated lawn mower operating with a low noise level and in which the source of power is mounted on the mower.

A further object of the invention is to provide a battery powered lawn mower which is designed for maximum efficiency in the use of the battery.

A further object is to provide a battery operated power mower which is simple to construct, sturdy, and inexpensive.

Figure 1:
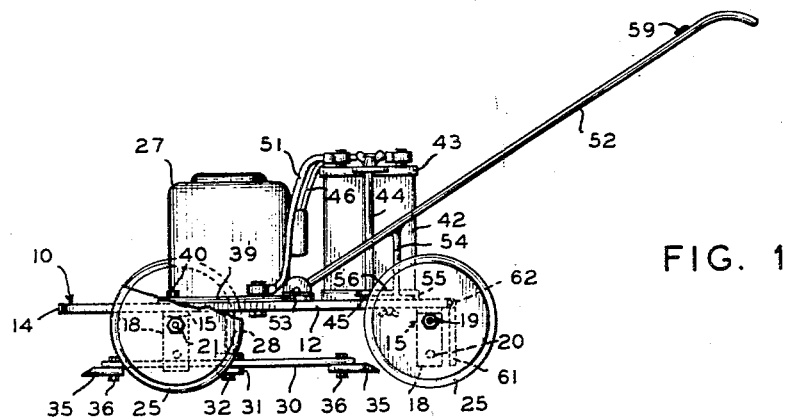
Figure 2:
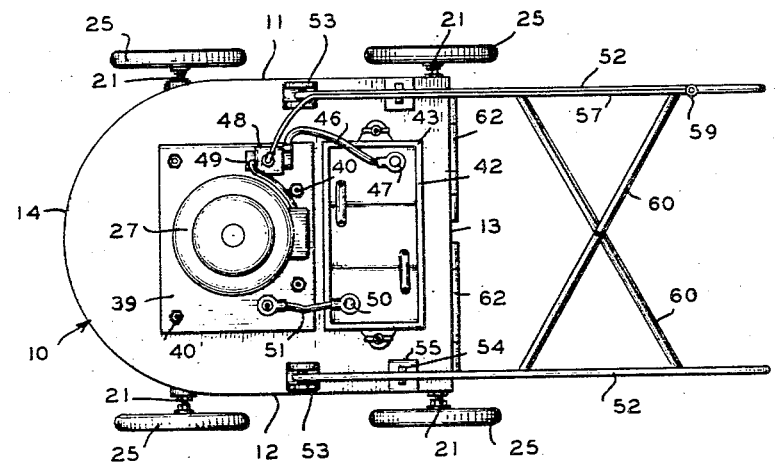

These and other objects of the invention will become apparent from the following description in conjunction with the accompanying drawing in which:

Fig. 1 is a side elevation of a mower constructed in accordance with the present invention;

Fig. 2, a top plan view; and

Figure 3:
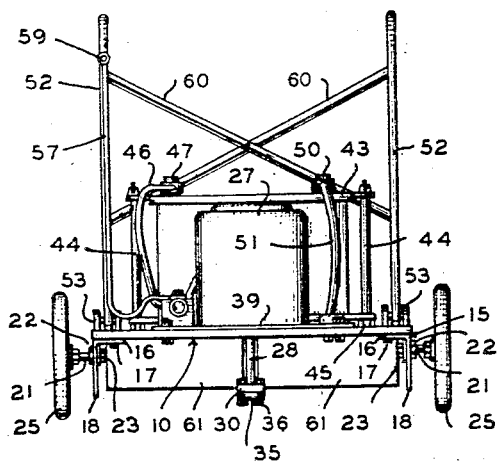

Fig. 3, an end elevation.

Referring to the drawing, the mower includes a substantially flat base 10 having straight sides 11 and 12, a straight back 13, and a curved bow 14. Attached to the rear corners and to the sides of the base at the rear of the curved portion 14 are angle brackets 15. Each angle bracket has a leg 16 attached by fastening means 17 to the underside of the base, the other leg 18 extending vertically downwardly from the edge of the base. The leg 18 has a plurality of spaced apertures 19 and 20 through which a threaded axle such as the cap screw 21, may extend. The cap screw is retained by fastening means 22 and 23 on either side of the leg 18 and has a wheel 25 with suitable antifriction means such as ball bearings (not shown). By selecting the apertures in which the wheel axles are mounted the height of the base above the ground may be varied.

A low voltage motor 27 is mounted on the forward portion of the base and has a shaft 28 extending through an aperture in the base. Cutter bar 30 having a collar 31 at its mid-point is attached to the shaft 28 by suitable fastening means 32.

Cutter blades 35 are attached by suitable fastening means 36 to each end of the bar 30. The cutter blades rotate in an arc which the base overlies, the base preferably extending slightly beyond the arc of the blades in order to afford sufficient protection.

The motor is preferably mounted on a plate 39 which is attached to the forward portion of the base by fastening means 40. A storage battery 42 is mounted centrally on the rearward portion of the base, the battery being secured thereto by frame 43 engaging the upper edges and attached to the base by clamps 44 on either side which are fastened by bolts 45 to the base.

Lead 46 extends from terminal 47 of the battery to solenoid switch 48, the switch being connected by lead 49 to motor 27. The other terminal 50 of the battery is grounded by the lead 51 to the plate 39.

The mower has a handle which comprises a pair of tubes 52 which are pivotally connected by brackets 53 to either side of the base 10. A strut or leg 54 is mounted at an angle to the tube and spaced from the bracket and has a flange 55 at its lower end which normally rests on the upper surface of the base. Fastening means 56 extend through the base and the flange 55 to normally hold the strut on the base. Leads 57 extend from the solenoid switch 48 to a control switch 59 on the upper portion of the handle. Cross members 60 extend between the tubes 52 to provide additional rigidity.

In order to protect the operator from discsharge rearwardly of the mower, including flying objects, a pair of safety shields 61 are attached by hinges 62 to the rear edge of the base 10. The shields extend across the rear edge of the mower base and in proximity to the ground but spaced thereabove sufficiently to pass over grass and the like during normal operation.

In the operation of the device the charged battery 42 is mounted on the rear portion of the base and fastened in place by the clamps. The leads are connected from the motor and its plate and the height of the cutter bars is adjusted by selecting the aperature in the angle bracket through which the wheel axles extend. Actuation of the switch 59 on the handle operates the solenoid switch 48 which closes the circuit of the battery to the motor. The device may then be pushed over the lawn in order to mow the grass.

As long as the operator holds the switch 59 in operating position the battery will continue to supply power to the motor. However, should the operator remove his hand from the switch for any reason, the solenoid switch 48 will immediately disconnect the battery from the motor. As a result, the mower will consume energy from the battery only while it is in actual use rather than being left in operation during non-productive periods.

The strut 54 permits the operator to exert force downwardly on the rear portion of the handle 52 in order to raise the forward portion of the mower for passing over obstacles or for turning. Since the shields 61 are hinged to the base the mower may be passed over relatively tall obstacles with the forward portion raised, as the shields may be pivoted over an obstacle which they encounter in order to clear it. When the device is stored the fastener 56 holding the strut on the base may be released and the handle raised to a vertical position in order to reduce the floor space occupied by the mower.

Although a particular embodiment of the invention has been shown and described it will be understood by those skilled in the art that the invention is not limited to the particular embodiment but that reasonable variations are within the invention and therefor that its scope is limited only as found in the following claim.

What is claimed is:

A battery powered lawn mower comprising a frame, ground engaging means on said frame for supporting the same for movement along the ground without appreciable rocking of the frame relative to the ground, a handle pivotally mounted on the frame for movement from a position near the ground to a higher elevation short of the vertical, an electric motor mounted on said frame, a cutting blade rotatably mounted on said frame and connected to be driven from said motor, a battery mounted on said frame near said motor, relatively short loss minimizing leads between said battery and said motor, a solenoid switch in one of said leads, a normally open switch mounted on said handle for convenient engagement by the hand of the operator while engaging said handle, conductors between said normally open switch on said handle and the solenoid of the motor switch whereby an operator may cause the mower to function only while he holds the switch closed whereby said battery will be used a minimium amount and its life will be proportionately prolonged.

References Cited in the file of this patent

UNITED STATES PATENTS

| | | |
|---|---|---|
| 2,417,613 | Radabaugh | Mar. 18, 1947 |
| 2,504,416 | Hileman | Apr. 18, 1950 |
| 2,565,044 | Puls | Aug. 21, 1951 |
| 2,597,735 | Jepson | May 20, 1952 |
| 2,645,300 | Watts et al. | July 14, 1953 |